(12) United States Patent
Kimura et al.

(10) Patent No.: US 12,380,744 B2
(45) Date of Patent: Aug. 5, 2025

(54) WHEEL STATE OBTAINING SYSTEM AND WHEEL STATE OBTAINING METHOD

(71) Applicant: Toyota Jidosha Kabushiki Kaisha, Toyota (JP)

(72) Inventors: Yosuke Kimura, Nissin (JP); Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/334,859

(22) Filed: Jun. 14, 2023

(65) Prior Publication Data

US 2024/0087372 A1 Mar. 14, 2024

(30) Foreign Application Priority Data

Sep. 12, 2022 (JP) ................................. 2022-144320

(51) Int. Cl.
G07C 5/02 (2006.01)
B60C 23/06 (2006.01)
B60R 16/023 (2006.01)
G01M 17/013 (2006.01)

(52) U.S. Cl.
CPC ..................... *G07C 5/02* (2013.01)

(58) Field of Classification Search
CPC ...... G07C 5/02; G01M 17/013; B60C 23/061; B60R 16/0232
USPC ...................................................... 701/34.4
See application file for complete search history.

(56) References Cited

U.S. PATENT DOCUMENTS

| | | | |
|---|---|---|---|
| 5,263,366 A * | 11/1993 | Sakamoto | F16C 41/007 73/115.08 |
| 5,734,319 A | 3/1998 | Stephens et al. | |
| 5,959,365 A * | 9/1999 | Mantini | B60C 23/0408 180/290 |
| 12,151,655 B2 * | 11/2024 | Hall | B60T 17/22 |
| 2007/0090933 A1 | 4/2007 | Nakao | |
| 2008/0243327 A1 * | 10/2008 | Bujak | B60W 30/12 340/442 |
| 2014/0219746 A1 * | 8/2014 | Dooner | F16B 41/005 411/429 |
| 2014/0309860 A1 * | 10/2014 | Paulin | B60R 25/102 73/146 |

(Continued)

FOREIGN PATENT DOCUMENTS

| | | |
|---|---|---|
| JP | 8-268013 A | 10/1996 |
| JP | 2002-337520 A | 11/2002 |

(Continued)

*Primary Examiner* — Tyler D Paige
(74) *Attorney, Agent, or Firm* — Sughrue Mion, PLLC

(57) ABSTRACT

A wheel state obtaining system configured to obtain a wheel state that is a state of at least one of a plurality of wheels of a vehicle includes: a wheel speed detection device configured to detect a wheel speed of each of the plurality of wheels; a traveling state detection device configured to detect a traveling state of the vehicle; and a controller. When the traveling state of the vehicle detected by the traveling state detection device is a predetermined set state, the controller obtains a wheel speed difference of two of the plurality of wheels based on the wheel speeds of the plurality of wheels detected by the wheel speed detection device. The controller determines whether at least one of the two wheels is in an abnormal state based on the wheel speed difference.

9 Claims, 11 Drawing Sheets

(56) References Cited

U.S. PATENT DOCUMENTS

| | | | | |
|---|---|---|---|---|
| 2016/0214430 A1* | 7/2016 | Mason | ................ | B60B 3/16 |
| 2017/0227042 A1* | 8/2017 | Mason | ................ | F16B 39/101 |
| 2018/0009429 A1* | 1/2018 | Hall | ................ | B60T 17/22 |
| 2018/0095008 A1* | 4/2018 | Kusumi | ................ | G01M 17/007 |
| 2019/0309785 A1* | 10/2019 | Daddey | ................ | G01R 33/3692 |
| 2021/0396572 A1* | 12/2021 | Scheuing | ................ | B60B 3/16 |
| 2022/0194122 A1* | 6/2022 | Fleck | ................ | B60B 3/165 |
| 2024/0087372 A1* | 3/2024 | Kimura | ................ | B60C 23/061 |

FOREIGN PATENT DOCUMENTS

| | | | | |
|---|---|---|---|---|
| JP | 2005-7937 A | | 1/2005 | |
| JP | 2007-112334 A | | 5/2007 | |
| JP | 2007-153052 A | | 6/2007 | |
| JP | 2010-285123 A | | 12/2010 | |
| JP | 6526818 B2 | | 6/2019 | |
| JP | 2024039735 A | * | 3/2024 | ................ G07C 5/02 |

* cited by examiner

WHEEL STATE OBTAINING SYSTEM AND WHEEL STATE OBTAINING METHOD

REFERENCE TO RELATED APPLICATIONS

This application claims priority from Japanese Patent Application No. 2022-144320 filed on Sep. 12, 2022. The entire content of the priority application is incorporated herein by reference.

BACKGROUND ART

The following disclosure relates to a wheel state obtaining system configured to obtain a state of a wheel of a vehicle.

Patent Document 1 (Japanese Patent No. 06526818) describes a wheel state obtaining system in which a first detection signal and a second detection signal are obtained based on a difference between a detection value of a wheel speed sensor provided for one wheel and a reference value. It is determined in the system that the wheel, for which the wheel speed sensor is provided, is in a loose state when at least one of the first detection signal and the second detection signal is greater than a detection threshold. The above-indicated Patent Document 1 describes that the detection values of the wheel speed sensors provided for other wheels may be used as the reference value.

SUMMARY

An aspect of the present disclosure relates to a technique of appropriately determining whether a state of a wheel is in an abnormal state.

In a wheel state obtaining system according to one aspect of the present disclosure, a wheel speed difference of two of a plurality of wheels is obtained based on wheel speeds of the plurality of wheels detected when a traveling state of a vehicle is a set state. It is determined in the system whether at least one of the plurality of wheels is in an abnormal state based on the wheel speed difference of the two wheels.

For instance, the abnormal state may be defined as a state in which hub bolts, hub nuts, etc., which rotatably hold a wheel to a body-side member, are loose and fastening of the wheel to the body-side member is loose. In such a state in which the hub bolts and the hub nuts are loose (hereinafter referred to as "loose state" where appropriate), the wheel speed greatly changes in one rotation of the wheel due to the looseness of the hub bolts and the hub nuts. This results in a great difference in the wheel speed difference of the two wheels.

The set state may be a state in which an external force applied to the wheel is small. When the traveling state of the vehicle is the set state, a change of the wheel speed due to the external force is prevented or reduced. It is thus possible to appropriately obtain a state of change of the wheel speed due to the looseness of the hub bolts and the hub nuts based on the wheel speeds of the plurality of wheels that are detected when the traveling state of the vehicle is the set state.

The wheel state obtaining system according to the present disclosure appropriately determines whether at least one of the plurality of wheels is in the loose state based on the wheel speeds detected when the traveling state of the vehicle is the set state.

It is noted that the obtainment of the wheel state can be performed utilizing a model obtained in advance by machine learning.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION

Figure 1:
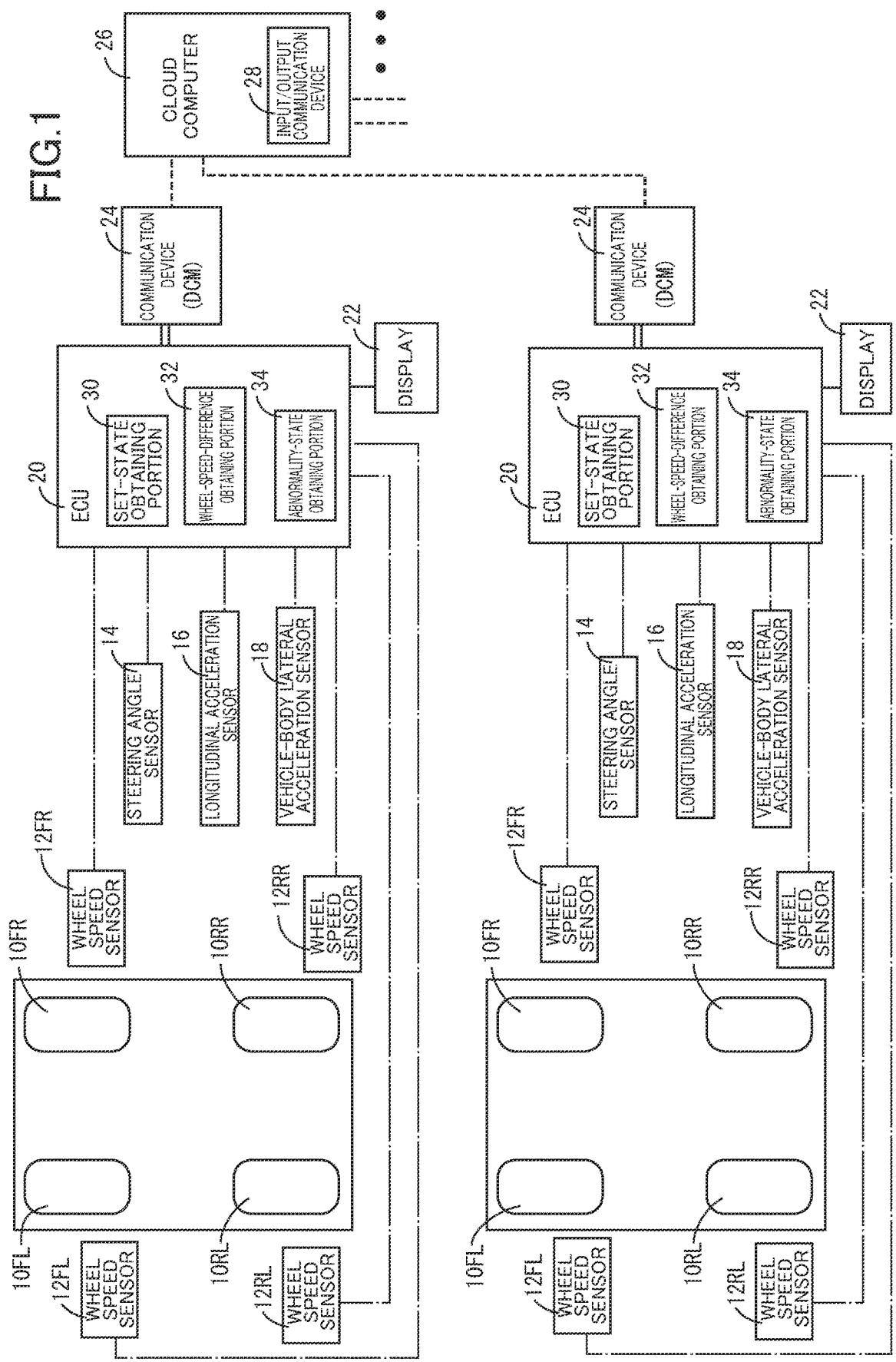
FIG. 1 is a conceptual view of a wheel state obtaining system according to a first embodiment of the present disclosure.

Referring to the drawings, there will be described below in detail a wheel state obtaining system according to one embodiment of the present disclosure.

First Embodiment

The wheel state obtaining system according to the present embodiment includes, for instance, wheel speed sensors 12FL, 12FR, 12RL, 12RR, a steering angle sensor 14, a longitudinal acceleration sensor 16, a vehicle-body lateral acceleration sensor 18, an ECU 20 constituted principally by a computer, and a server 26. In the present embodiment, front left and right wheels 10FL, 10FR are drive wheels and steerable wheels.

The wheel speed sensors 12FL, 12FR, 12RL, 12RR respectively detect wheel speeds of a front left wheel 10FL, a front right wheel 10FR, a rear left wheel 10RL, and a rear right wheel 10RR, which are a plurality of wheels of a vehicle.

The steering angle sensor 14 of the present embodiment is configured to detect a steering angle of the front left and right wheels 10FL, 10FR, which are the steerable wheels. The steering angle may take a positive value or a negative value depending on a direction of turning of the steerable wheels. The steering angle sensor may be replaced with an operation amount sensor configured to detect an operation amount of a steering operation member (not illustrated), which represents an operation state of the steering operation member. (The operation amount may be the steering angle.)

The longitudinal acceleration sensor 16 is configured to detect acceleration applied to the vehicle in the front-rear direction. The acceleration may take a positive value or a negative value. The negative acceleration can be referred to as deceleration.

The vehicle-body lateral acceleration sensor 18 is configured to detect vehicle-body lateral acceleration that acts on a body of the vehicle in the lateral direction. The vehicle-body lateral acceleration sensor 18 is one example of a vehicle-body lateral acceleration detection device.

In the present embodiment, the wheel speed sensors 12FL, 12FR, 12RL, 12RR, etc., constitute a wheel speed detection device, and the steering angle sensor 14, the longitudinal acceleration sensor 16, etc., constitute a traveling state detection device. The traveling state detection device may further include the wheel speed sensors 12FL, 12FR, 12RL, 12RR and the vehicle-body lateral acceleration sensor 18.

The ECU 20 includes, for instance, an execution device, a memory, and an input/output device. There are connected, to the input/output device, the wheel speed sensors 12FL, 12FR, 12RL, 12RR, the steering angle sensor 14, the longitudinal acceleration sensor 16, and the vehicle-body lateral acceleration sensor 18. Further, a display 22 and a communication device 24 are connected to the ECU 20. A cloud computer 26, which functions as a server, is connected to the communication device 24. The ECUs 20 of a plurality of vehicles are connected to the cloud computer 26 via the corresponding communication devices 24. The cloud computer 26 includes an input/output communication device 28 capable of performing communication with an external device or the like.

In the following description, the wheel speed sensors, the wheel speed, the wheel speed difference, etc., will be referred to without suffixes such as FL, FR, RL, RR, f, r, L, R indicative of the corresponding wheel positions where it is not necessary to distinguish them by their wheel positions or where they are collectively referred to.

The ECU 20 includes, for instance, a set-state obtaining portion 30, a wheel-speed-difference obtaining portion 32, and an abnormality-state obtaining portion 34.

The set-state obtaining portion 30 is configured to determine whether a traveling state of the vehicle detected by the traveling state detection device is a predetermined set state. The set state is a state appropriate for determining whether the wheel 10 is in an abnormal state. The set state is a state in which an external force applied to the wheel 10 is small. For instance, the set state may be at least one of: a state in which an absolute value of the steering angle of the steerable wheels detected by the steering angle sensor 14 is less than a set steering angle; and a state in which an absolute value of the longitudinal acceleration detected by the longitudinal acceleration sensor 16 is less than set acceleration. Further, the set state may be at least one of: a nearly straight traveling state of the vehicle; and a nearly constant-speed traveling state of the vehicle.

When it is determined by the set-state obtaining portion 30 that the traveling state of the vehicle is the set state, the wheel-speed-difference obtaining portion 32 obtains, based on the wheel speeds of the respective four wheels 10 detected by the corresponding wheel speed sensors 12, a wheel speed difference δf of the front-side left and right wheels 10FL, 10FR that are two wheels of a wheel pair, a wheel speed difference δr of the rear-side left and right wheels 10RL, 10RR that are two wheels of a wheel pair, a wheel speed difference δL of the left-side front and rear wheels 10FL, 10RL that are two wheels of a wheel pair, and a wheel speed difference δR of the right-side front and rear wheels 10FR, 10RR that are two wheels of a wheel pair. A plurality of wheel speeds is detected for each of the four wheels 10 by the corresponding wheel speed sensor 12 based on which a plurality of wheel speed differences δf, a plurality of wheel speed differences δr, a plurality of wheel speed differences δL, and a plurality of wheel speed differences δR are obtained.

The abnormality-state obtaining portion 34 obtains a variation value indicative of variations of each of the wheel speed differences δf, δr, δL, δR based on the wheel speed differences δf, δr, δL, δR each obtained in a plural number by the wheel-speed-difference obtaining portion 32. It is determined, based on the variation values, whether at least one of the four wheels 10 is in the abnormal state. In the present embodiment, the abnormal state refers to a state in which hub bolts, hub nuts, etc., by which the wheel 10 is rotatably held by the body-side member, are loose, and fastening of the wheel 10 to the body-side member is loose. This state will be referred to as "loose state" where appropriate. A plurality of wheel speeds is detected for each of the four wheels 10 by the corresponding wheel speed sensor 12. The number of the wheel speeds to be detected may be a number that enables the variation value to be obtained.

Figure 2:
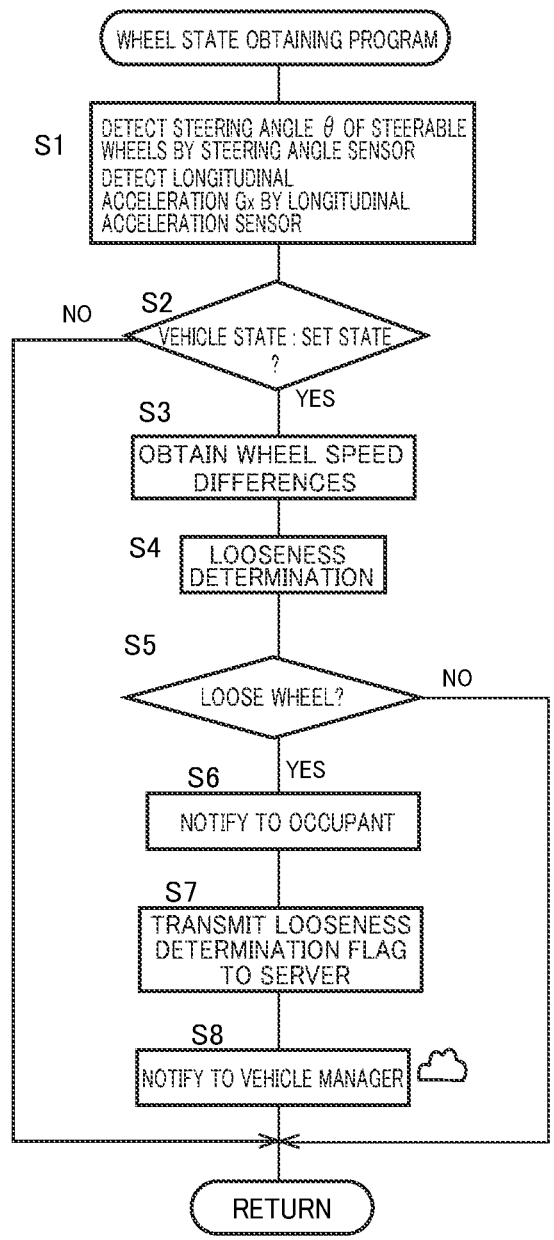
FIG. 2 is a flowchart representing obtainment of a wheel state executed by the wheel state obtaining system.

In the thus configured wheel state obtaining system, a wheel state obtaining program represented by a flowchart of FIG. 2 is executed every time a predetermined set time elapses.

At Step 1, there are obtained longitudinal acceleration that is the detection value of the longitudinal acceleration sensor 16 and the steering angle θ that is the detection value of the steering angle sensor 14. (Hereinafter, Step 1 will be abbreviated as "S1". Other steps will be similarly abbreviated.)

At S2, the traveling state of the vehicle is obtained based on the longitudinal acceleration, the steering angle θ, etc., and it is determined whether the traveling state of the vehicle is the set state. When an affirmative determination YES is made at S2, the control flow proceeds to S3 to obtain the wheel speed differences δf, δr, δL, δR each in a plural number as later described. At S4 and S5, it is determined whether at least one wheel 10 among the four wheels 10 is in the loose state.

When an affirmative determination YES is made at S5, the control flow proceeds to S6 to notify the fact that at least one wheel 10 is in the loose state to an occupant of the vehicle through indication on a display 22, for instance. At S7, a looseness determination flag is transmitted to the cloud computer 26. The looseness determination flag is transmitted from the ECU 20 to the communication device 24, and the communication device 24 transmits the looseness determination flag to the cloud computer 26. At S8, the cloud computer 26 notifies, via an input/output communication device 28, the fact that at least one wheel 10 is in the loose state to a vehicle manager such as a car-sharing business operator, a vehicle operation business operator such as a vehicle maintenance business operator (hereinafter referred to as "vehicle manager", for instance). The vehicle manager is notified of the fact via e-mails, dedicated applications, network systems, telephone, etc., each as the input/output communication device 28.

Figure 3:
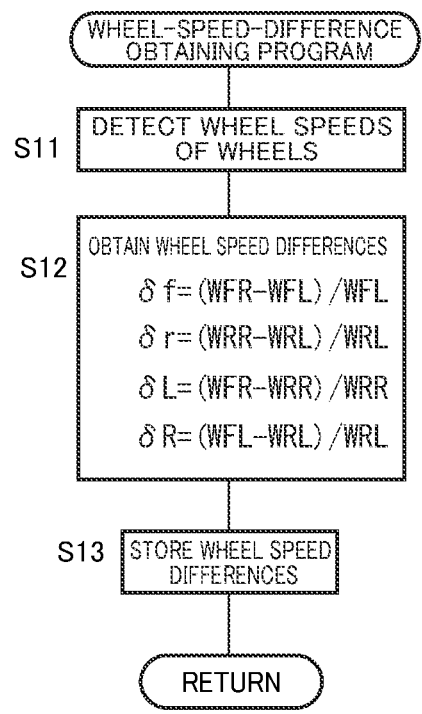
FIG. 3 is a flowchart representing a wheel-speed-difference obtaining program stored in the wheel state obtaining system.

The obtainment of the wheel speed differences $\delta f$, $\delta r$, $\delta L$, $\delta R$ at S3 is performed by the wheel-speed-difference obtaining portion 32 of the ECU 20 of the vehicle. In the present embodiment, a wheel-speed-difference obtaining program represented by a flowchart of FIG. 3 is repeatedly executed every time a set time elapses.

At S11, the wheel speed sensors 12 detect the wheel speeds of the respective four wheels 10. The wheel speed differences $\delta f$, $\delta r$, $\delta L$, $\delta R$ are obtained at S12 and stored at S13. S11-S13 are repeatedly executed, so that the wheel speed differences $\delta f$, $\delta r$, $\delta L$, $\delta R$ are obtained each in a plural number and stored.

In the present embodiment, the wheel speed difference $\delta$ is obtained in a plural number. The number of the wheel speed differences $\delta$ to be obtained may be determined to be a number that enables appropriate obtainment of a standard deviation that is a variation value.

In the present embodiment, the wheel speed difference $\delta f$ is a value (WFR−WFL)/WFL obtained by dividing a wheel speed difference (WFR−WFL) of the front-side left and right wheels 10FL, 10FR by a wheel speed WFL of the front left wheel 10FL. The wheel speed difference $\delta r$ is a value (WRR−WRL)/WRL obtained by dividing a wheel speed difference (WRR−WRL) of the rear-side left and right wheels 10RL, 10RR by a wheel speed WRL of the rear left wheel 10RL. The wheel speed difference $\delta L$ is a value (WFL−WRL)/WRL obtained by dividing a wheel speed difference (WFL−WRL) of the left-side front and rear wheels 10FL, 10RL by a wheel speed WRL of the rear left wheel 10RL. The wheel speed difference $\delta R$ is a value (WFR−WRR)/WRR obtained by dividing a wheel speed difference (WFR−WRR) of the right-side front and rear wheels 10FR, 10RR by a wheel speed WRR of the rear right wheel 10RR.

By thus dividing the wheel speed difference (WFR−WFL) of the left and right wheels 10FL, 10FR by the wheel speed WFL of the front left wheel 10FL as described above, for instance, it is possible to reduce an influence of the level of the wheel speed on the wheel speed difference.

Examples of the wheel speed differences $\delta f$, $\delta r$, $\delta L$, $\delta R$ of two wheels 10 are illustrated in FIGS. 5A, 5B, 5C, and 5D, respectively. Here, a case is considered in which the rear left wheel is in the loose state.

Figure 5A:
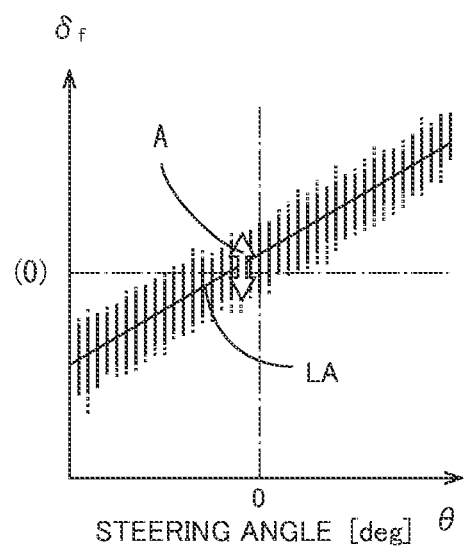
FIG. 5A is a graph representing a relationship between a steering angle and a wheel speed difference of front-side right and left wheels of a vehicle.

FIG. 5A illustrates a change in the wheel speed difference $\delta f\{(WFR-WFL)/WFL\}$ with respect to a change in the steering angle $\theta$. In a case where the steering angle $\theta$ is substantially 0, a value obtained by subtracting the wheel speed WFL of the front left wheel 10FL from the wheel speed WFR of the front right wheel 10FR should be small. Further, when an absolute value of the steering angle $\theta$ increases, a difference between the rotational speed of the wheel located on the outer side in turning of the vehicle and the rotational speed of the wheel located on the inner side in turning of the vehicle increases, and an absolute value of the wheel speed difference $\delta f$ accordingly increases. The solid line LA in FIG. 5A indicates an average value of the wheel speed difference $\delta f$. As indicated by the solid line LA, the average value of the wheel speed difference $\delta f$ increases with an increase in the steering angle $\theta$.

The wheel speed detected during one rotation of the wheel 10 is not always constant but may change depending on the state of the wheel 10, for instance. Accordingly, the difference between the wheel speed WFR of the front right wheel 10FR and the wheel speed WFL of the front left wheel 10FL is not always constant but may vary.

In a case where the wheel 10 is in the normal state, the change in the wheel speed during one rotation of the wheel 10 is small. Thus, in a case where the front right wheel 10FR and the front left wheel 10FL are both in the normal state, the wheel speed difference $\delta f$ of the front right wheel 10FR and the front left wheel 10FL is small, and the variations of the wheel speed difference $\delta f$ is usually small. In FIG. 5A, the length of the arrow A represents the double (2ef) of the standard deviation ef, which is the variation value indicative of the variations of the wheel speed difference $\delta f$. As illustrated in FIG. 5A, in a case where the front right wheel 10FR and the front left wheel 10FL are both in the normal state (i.e., not in the loose state), the standard deviation ef is small.

Figure 5B:
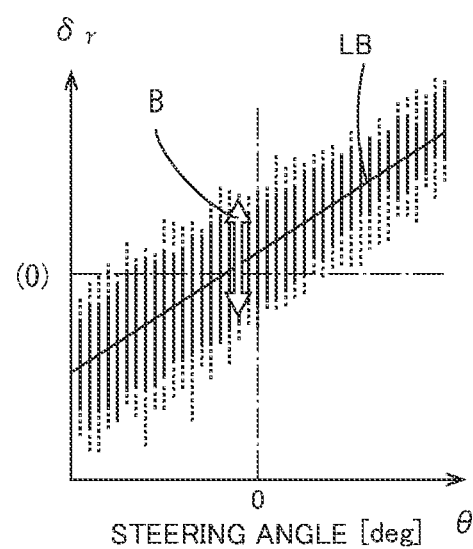
FIG. 5B is a graph representing a relationship between the steering angle and a wheel speed difference of rear-side right and left wheels of the vehicle.

FIG. 5B illustrates a change in the wheel speed difference $\delta r\{(WRR-WRL)/WRL\}$ with respect to a change in the steering angle $\theta$.

An average value of the wheel speed difference $\delta r$ indicated by the solid line LB in FIG. 5B increases with an increase in the steering angle $\theta$, as in the example of FIG. 5A. Because the rear left wheel 10RL is in the loose state, however, the wheel speed WRL of the rear left wheel 10RL greatly changes during one rotation, and the variations of the wheel speed difference $\delta r$ is large. Accordingly, the double (2er) of the standard deviation er, which is represented by the length of the arrow B in FIG. 5B, is large.

Figure 5C:
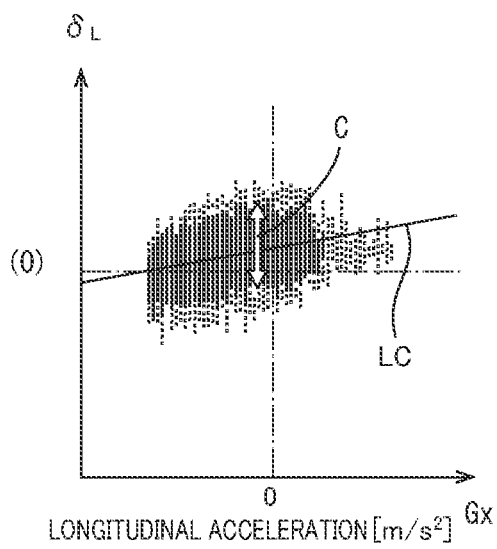
FIG. 5C is a graph representing a relationship between longitudinal acceleration and a wheel speed difference of left-side front and rear wheels of the vehicle.

FIG. 5C illustrates a change in the wheel speed difference $\delta L\{(WFL-WRL)/WRL\}$ with respect of a change in the longitudinal acceleration Gx.

As indicated by the solid line LC, which represents an average value of the wheel speed difference $\delta L$, a difference between the wheel speed of the front left wheel 10FL and the wheel speed of the rear left wheel 10RL is small in a case where the longitudinal acceleration Gx is substantially 0. When the longitudinal acceleration Gx increases, namely, when positive acceleration increases, the drive force is applied to the front left wheel 10FL, which is the drive wheel. In this case, the wheel speed of the front left wheel 10FL increases whereas the wheel speed of the rear left wheel 10RL increases with delay. Accordingly, it is estimated that the average value of the wheel speed difference $\delta L$ increases with an increase in the longitudinal acceleration Gx. When the longitudinal acceleration Gx decreases, namely, when deceleration acts on the vehicle, the wheel speed of the front left wheel 10FL decreases more quickly than the wheel speed of the rear left wheel 10RL for the reasons that: the vehicle takes a nose-diving posture; and the drive source is connected to the front left wheel 10FL. Thus, it is estimated that the average value of the wheel speed difference $\delta L$ decreases with a decrease in the longitudinal acceleration Gx, namely, with an increase in deceleration.

As described above, because the rear left wheel 10RL is in the loose state, the variations of the wheel speed difference $\delta L$ is large as indicated by the arrow C and the standard deviation eL is accordingly large.

Figure 5D:
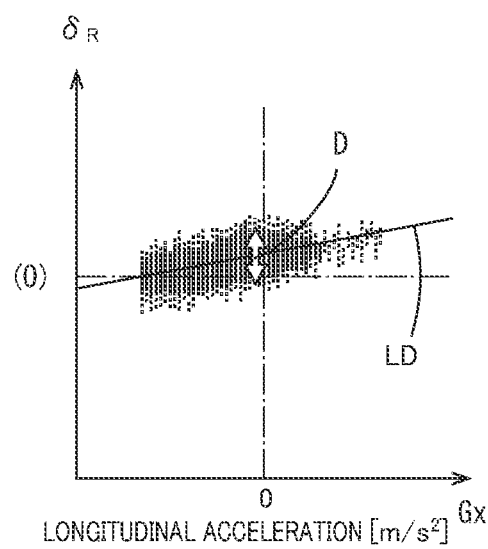
FIG. 5D is a graph representing a relationship between the longitudinal acceleration and a wheel speed difference of right-side front and rear wheels of the vehicle.

FIG. 5D illustrates a change in the wheel speed difference $\delta R\{(WFR-WRR)/WRR\}$ with respect to a change in the longitudinal acceleration Gx.

As in the example of FIG. 5C, an average value of the wheel speed difference δR increases with an increase in the longitudinal acceleration Gx, as indicated by the solid line LD.

Because the front right wheel 10FR and the rear right wheel TORR are both in the normal state (i.e., not in the loose state), the standard deviation eR of the wheel speed difference δR is small as indicated by the arrow D.

Figure 4:
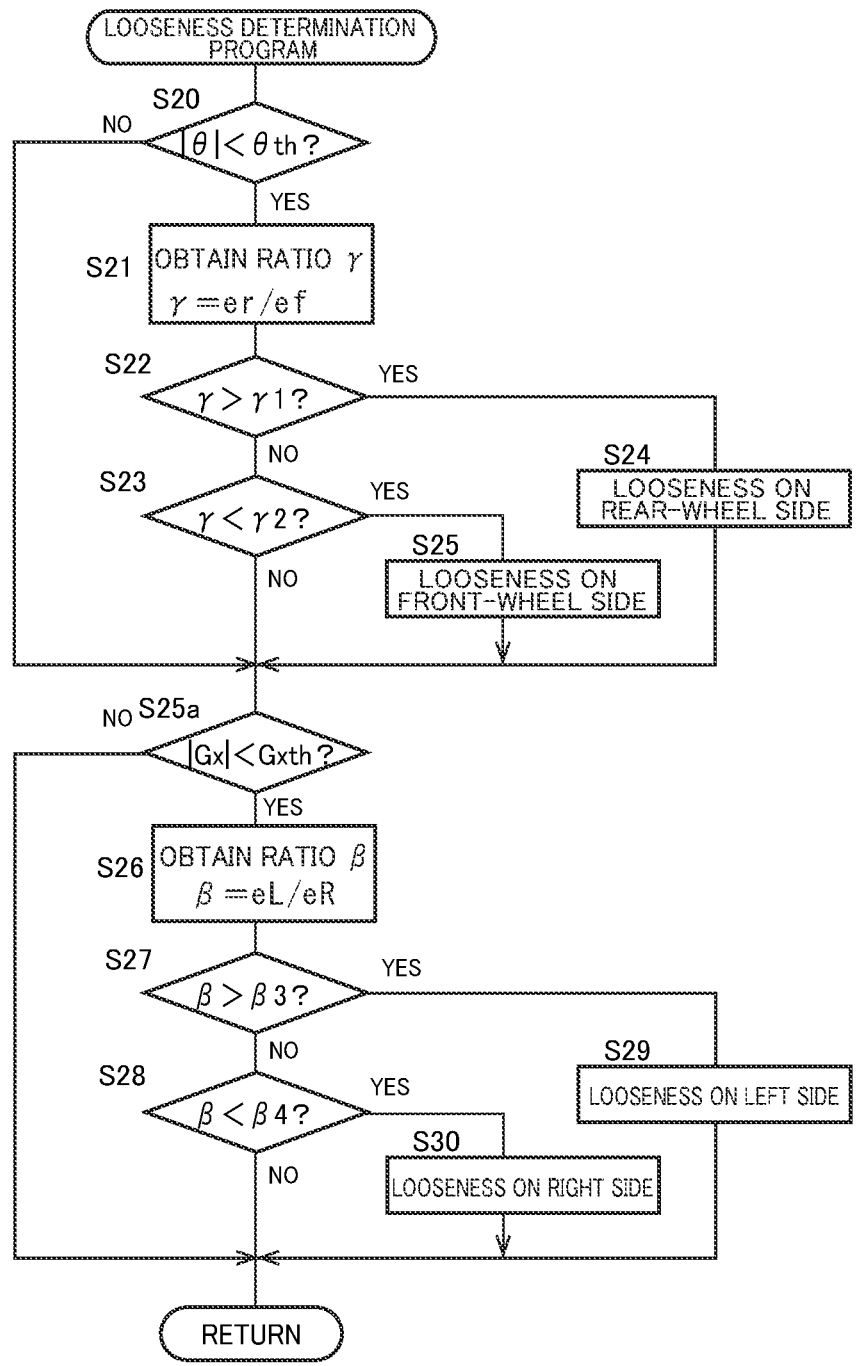
FIG. 4 is a flowchart representing a looseness determination program stored in the wheel state obtaining system.

The looseness determination at S4 is executed by the abnormality-state obtaining portion 34 of the ECU 20 of the vehicle. A looseness determination program represented by a flowchart of FIG. 4 is executed, so that it is determined whether at least one wheel 10 is in the loose state based on the wheel speed differences δf, δr, δL, δR each obtained in a plural number by the wheel-speed-difference obtaining portion 32.

In the present embodiment, based on the wheel speed differences δf, δr, δL, δR each obtained in a plural number, the standard deviations ef, er, eL, eR, which are the variation values of the corresponding wheel speed differences δf, δr, δL, δR, are obtained. Based on a ratio of the standard deviations ef, er, eL, eR, it is determined whether at least one wheel 10 is in the loose state.

When the traveling state of the vehicle is a state in which the absolute value of the steering angle θ is less than the set steering angle, there is obtained a ratio γ between the standard deviation ef of the wheel speed difference δf of the front-side left and right wheels 10FL, 10FR and the standard deviation er of the wheel speed difference δr of the rear-side left and right wheels 10RL, TORR. γ=er/ef In a case where the front-side right and left wheels are both in the normal state when the traveling state of the vehicle is a state in which the absolute value of the steering angle θ is less than the set steering angle, for instance, the variations of the wheel speed difference δf of the right and left wheels are small, and the standard deviation ef is small. In contrast, in a case where one of the rear-side right and left wheels is in the loose state, the variations of the wheel speed difference δr of the right and left wheels are great, and the standard deviation er is great. Thus, it is possible to appropriately obtain the presence or absence of the wheel that is in the loose state based on the ratio γ of the standard deviations ef, er.

When the absolute value of the steering angle θ is greater than the set steering angle, the wheel speed of the wheel 10 during one rotation thereof may change due to the external force for the reason that the frictional force in the lateral direction that acts between the wheel 10 and the road surface is great, for instance.

When the absolute value of the steering angle θ is less than the set steering angle, on the other hand, the change of the wheel speed due to the external force is small. It is thus possible to appropriately obtain the state of change of the wheel speed due to the looseness of fastening of the wheel 10 with respect to the body-side member.

When the ratio γ is greater than a first set ratio γ1 that is greater than 1 (γ>γ1>1), it is determined that at least one of the rear-side left and right wheels 10RL, 10RR is in the loose state.

When the ratio γ is less than a second set ratio γ2 that is less than 1 (γ<γ2<1), it is determined that at least one of the front-side left and right wheels 10FL, 10FR is in the loose state.

When the traveling state of the vehicle is a state in which the absolute value of the longitudinal acceleration Gx is less than the set acceleration, there is obtained a ratio β between the standard deviation eL of the wheel speed difference δL of the left-side front and rear wheels 10FL, 10RL and the standard deviation eR of the wheel speed difference δR of the right-side front and rear wheels 10FR, 10RR. β=eL/eR In a case where the right-side front and rear wheels are both in the normal state when the traveling state of the vehicle is the state in which the absolute value of the longitudinal acceleration Gx is less than the set acceleration, for instance, the variations of the wheel speed difference δR of the front and rear wheels are small, and the standard deviation eR is small. On the contrary, in a case where at least one of the left-side front and rear wheels is in the loose state, the variations of the wheel speed difference δL of the front and rear wheels are great, and the standard deviation eL is great.

It is thus possible to appropriately determine whether the change of the wheel speed during one rotation of the wheel is large based on the ratio β of the standard deviations eL, eR of the wheel speed differences δL, R.

When the absolute value of the longitudinal acceleration Gx is not less than the set acceleration, the wheel speed during one rotation of the wheel 10 may change due to the external force for the reason that the frictional force in the front-rear direction that acts between the wheel 10 and the road surface is large, for instance.

When the absolute value of the longitudinal acceleration Gx is less than the set acceleration, on the other hand, the change of the wheel speed due to the external force is small. It is thus possible to appropriately obtain the state of change of the wheel speed due to the looseness of fastening of the wheel 10 with respect to the body-side member.

When the ratio β is greater than a third set ratio β3 that is greater than 1 (β>β3>1), it is determined that at least one of the left-side front and rear wheels 10FL, 10RL is in the loose state.

When the ratio β is less than a fourth set ratio β4 that is less than 1 (β<β4<1), it is determined that at least one of the right-side front and rear wheels 10RL, 10RR is in the loose state.

The looseness determination program represented by the flowchart of FIG. 4 is executed every time a set time elapses.

At S20, it is determined whether the traveling state of the vehicle is the state in which the absolute value of the steering angle θ is less than the set steering angle. (The state can be considered as a nearly straight traveling state.) When a negative determination NO is made at S20, S25a and subsequent steps are executed. When an affirmative determination YES is made, the ratio γ is obtained at S21, it is determined at S22 whether the ratio γ is greater than the first set ratio yl, and it is determined at S23 whether the ratio γ is less than the second set ratio γ2. When an affirmative determination YES is made at S22, it is determined at S24 that at least one of the rear-side left and right wheels 10RL, 10RR is in the loose state. When a negative determination NO is made at S22 and an affirmative determination YES is made at S23, it is determined at S25 that at least one of the front-side left and right wheels 10FL, 10FR is in the loose state.

At S25a, it is determined whether the traveling state of the vehicle is the state in which the absolute value of the longitudinal acceleration Gx is less than the set acceleration. When an affirmative determination YES is made at S26, the ratio β is obtained. It is determined at S27 whether the ratio β is greater than the third set ratio β3, and it is determined at S28 whether the ratio β is less than the fourth set ratio β4. When an affirmative determination YES is made at S27, it is determined at S29 that at least one of the left-side front and rear wheels 10FL, 10RL is in the loose state. When a negative determination NO is made at S27 and an affirmative determination YES is made at S28, it is determined at S30 that at least one of the right-side front and rear wheels 10FR, TORR is in the loose state.

Based on the determination result, S6-S8 are executed.

In the present embodiment, a plurality of the wheel speeds is detected for each of the four wheels 10 by the corresponding wheel speed sensor 12 when the traveling state of the vehicle is the set state. Based on the wheel speeds W, the wheel speed difference δf of the front-side left and right wheels 10FL, 10FR, the wheel speed difference δr of the rear-side left and right wheels 10RL, TORR, the wheel speed difference δL of the left-side front and rear wheels 10FL, 10RL, and the wheel speed difference δR of the right-side front and rear wheels 10FR, TORR are obtained each in a plural number, and the standard deviations ef, er, eL, eR are obtained. The ratio γ (er/ef) of the standard deviations and the ratio β (eL/eR) of the standard deviations are obtained. Based on the ratios γ, β, it is determined whether at least one wheel 10 is in the loose state, and the position of the wheel 10 that is in the loose state is obtained. For instance, when it is determined that at least one of the rear-side left and right wheels 10RL, 10RR is in the loose state and it is determined that at least one of the left-side front and rear wheels 10FL, 10RL is in the loose state, it can be determined that the wheel in the loose state is the rear left wheel 10RL.

In this instance, the wheel speeds W are detected when the traveling state of the vehicle is the set state, the wheel speed differences δ and the standard deviations e are obtained based on the wheel speeds W, and it is determined whether the wheel 10 is in the loose state. The wheel speed differences δ and the standard deviations e are obtained based on the wheel speeds W detected in a state in which the external force that acts on the wheel 10 is small, thus making it possible to appropriately determine whether the wheel 10 is in the loose state.

Further, it is determined whether the wheel 10 is in the loose state based on the ratio of the standard deviations e, each of which is the variation value of the wheel speed difference S. This enables the tendency of the magnitude of the change in the wheel speed W to be accurately obtained, making it possible to appropriately determine whether the wheel 10 is in the loose state.

The fact that the wheel 10 is in the loose state is notified to not only the occupant of the vehicle but also the vehicle manager and the operation management business operator. This enables the vehicle manager and the operation management business operator to recognize the safety of the vehicle.

Because the wheel state obtaining system of Patent Document 1 described above corrects the detection values detected in a situation in which the wheel speed sensors are defective, the detection value for each tooth of the wheel speed sensor is detected, resulting in a high frequency of use of a processing device principally constituted by a computer.

In the wheel state obtaining system of the present embodiment, in contrast, it is determined whether at least one wheel 10 is in the abnormal state based on the variation value of the wheel speed difference δ of the two wheels 10. Thus, it is not essential to obtain the detection value for each tooth of the wheel speed sensor 12, making it possible to lower the frequency of use of the ECU 20 in obtaining the wheel state.

In the wheel state obtaining system of the present embodiment, it is determined whether the wheel 10 is in the loose state based on the wheel speeds detected when the traveling state of the vehicle is the set state. This configuration can lower the frequency of use of the ECU 20, as compared with a configuration in which the wheel speeds are constantly detected.

In a case where the air pressure of the tire of the wheel 10 is reduced, for instance, the radius of the wheel 10 becomes smaller, and the wheel speed W becomes lower. Accordingly, the average value of the wheel speed difference of the two wheels 10 that include the wheel 10 in question is increased. In this case, however, the variations of the wheel speed difference of the two wheels 10 do not increase. The wheel state obtaining system according to the present embodiment does not detect the state in which the air pressure of the tire is reduced but appropriately detects whether the wheel 10 is in the loose state.

In the embodiment illustrated above, the standard deviation e, which is the variation value of the wheel speed difference δ, is used. The variation value of the wheel speed difference δ is not limited to the standard deviation e but may be a variance, a difference between a maximum value and a minimum value, or an interquartile range, for instance. The interquartile range is a difference between a first quartile and a third quartile. The first quartile and the third quartile are as follows. When a data set, in which data are arranged in order of size, is divided into quarters, the first quartile is a value at 25%, and the third quartile is a value at 75%. Anyway, all the above examples are values that increase with an increase in the variations of the wheel speed difference.

In the embodiment illustrated above, the set state of the traveling state of the vehicle is at least one of the nearly straight traveling state and the nearly constant-speed traveling state. The set state may be, for instance, a state in which the traveling state changes between the straight traveling state and a turning state or a state in which the traveling state changes between the constant-speed traveling state and a deceleration or acceleration state. When the external force applied to the wheel 10 changes such as when the traveling state changes between the straight traveling state and the turning state or when the traveling state changes between the constant-speed traveling state and the deceleration or acceleration state, the hub bolts and the nuts move relative to each other, causing a considerable change in the wheel speed. In a period of transition of those states, it may be difficult to obtain a sufficient number of the wheel speeds required for obtaining the variation value. In such an instance, the wheel speeds obtained in a plurality of transition periods are added up to thereby obtain the variation value of the wheel speed difference.

In the turning state of the vehicle, the wheel speed differences δf, δr of the right and left wheels are large. In the deceleration or acceleration state, the wheel speed differences δL, δR of the front and rear wheels are large. In view of this, it is desirable to correct the wheel differences based on the steering angle θ of the steerable wheels of the vehicle, the longitudinal acceleration Gx applied to the vehicle, etc., to thereby obtain the variation value.

In the embodiment illustrated above, it is determined that at least one of the four wheels 10 is in the abnormal state when the ratio between the variation value of the wheel speed difference of the two wheels 10 of one of two wheel pairs and the variation value of the wheel speed difference of the two wheels 10 of the other of the two wheel pairs falls outside the set range. This is not essential. For instance, it may be determined that at least one of the two wheels 10 is in the abnormal state when the standard deviation e, which is the variation value of the wheel speed difference δ of the two wheels 10, is greater than a predetermined threshold eth.

Figure 11:
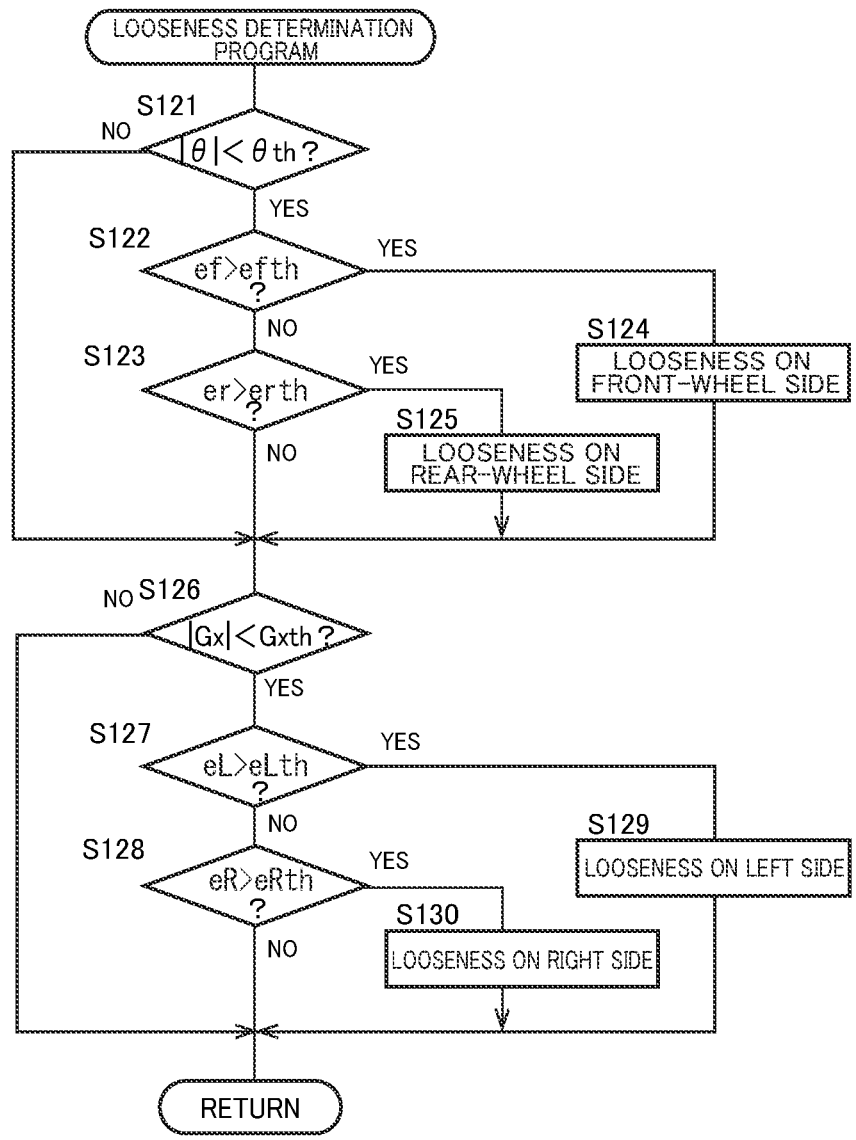
FIG. 11 is a flowchart representing a looseness determination program different from the flowchart of FIG. 4.

There will be described such a case based on a looseness determination program represented by a flowchart of FIG. 11.

At S121, it is determined whether the absolute value of the steering angle θ of the steerable wheels is less than the set steering angle. When an affirmative determination YES is made, it is determined at S122 whether the standard deviation ef of the wheel speed difference δf of the front-side left and right wheels is greater than a threshold efth, and it is determined at 123 whether the standard deviation er of the wheel speed difference δr of the rear-side left and right wheels is greater than a threshold erth. When an affirmative determination YES is made at S122, the control flow proceeds to S124 at which it is determined that at least one of the front-side left and right wheels 10FL, 10FR is in the abnormal state. When an affirmative determination YES is made at S123, it is determined at S125 that at least one of the rear-side left and right wheels 10RL, 10RR is in the abnormal state.

At S126, it is determined whether the absolute value of the longitudinal acceleration is less than the set acceleration. When an affirmative determination YES is made, it is determined at S127 whether the standard deviation eL of the wheel speed difference δL of the left-side front and rear wheels is greater than a threshold eLth, and it is determined at 128 whether the standard deviation eR of the wheel speed difference δR of the right-side front and rear wheels is greater than a threshold eRth. When an affirmative determination YES is made at S127, it is determined at S129 that at least one of the left-side front and rear wheels 10FL, 10RL is in the abnormal state. When an affirmative determination YES is made at S128, it is determined at S130 that at least one of the right-side front and rear wheels 10FR, 10RR is in the abnormal state.

In the present embodiment, a set-state obtaining portion is constituted by a portion of the ECU 20 that executes S2 of the wheel state obtaining program represented by the flowchart of FIG. 2 and a portion of the ECU 20 that stores S2, for instance. A wheel-speed-difference obtaining portion is constituted by a portion of the ECU 20 that executes S3 of the flowchart of FIG. 2 (i.e., the wheel-speed-difference obtaining program represented by the flowchart of FIG. 3) and a portion of the ECU 20 that stores S3, for instance. An abnormality-state obtaining portion is constituted by a portion of the ECU 20 that stores S4 and S5 of the flowchart of FIG. 2 (i.e., the looseness determination program represented by the flowchart of FIG. 4 or FIG. 11) and a portion of the ECU 20 that executes S3, for instance.

Execution of S2 corresponds to a step of determining whether the traveling state of the vehicle is the set state. Execution of S3 corresponds to a step of obtaining wheel-speed differences. Execution of S4 and S5 corresponds to a step of determining whether at least one of the plurality of wheels in in the abnormal state.

Second Embodiment

In the embodiment illustrated above, the wheel state is obtained based on the ratio of the variation values of the wheel speed differences S. The wheel state can be obtained based on both the ratio of the variation values of the wheel speed differences δ and the variation value of the vehicle-body lateral acceleration Gy.

Figure 6A:
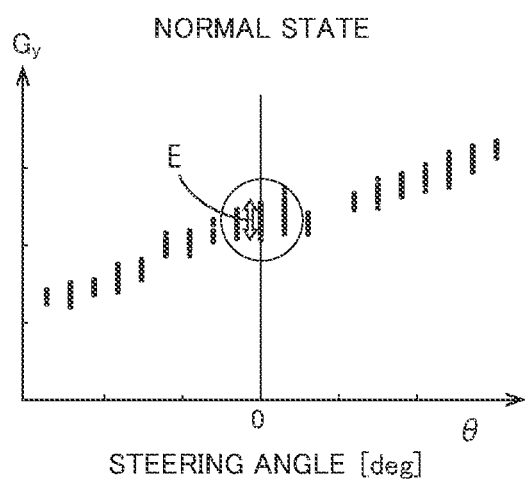
FIG. 6A is a view illustrating a relationship between vehicle-body lateral acceleration and a steering angle when a wheel of a vehicle, on which a wheel state obtaining system according to a second embodiment of the present disclosure is installed, is in a normal state.
Figure 6B:
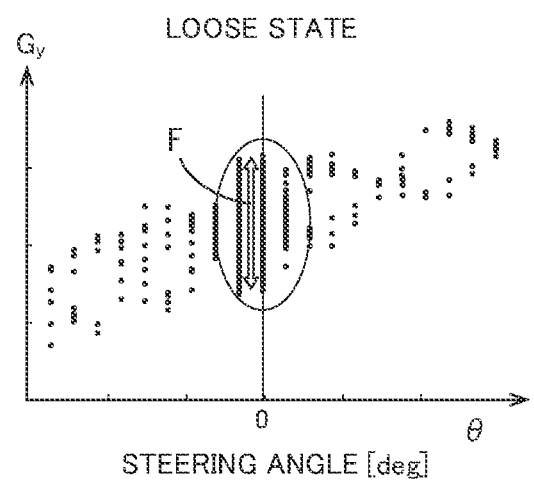
FIG. 6B is a view illustrating a relationship between the vehicle-body lateral acceleration and the steering angle when a wheel is in a loose state.

One example of a change in the vehicle-body lateral acceleration will be described referring to FIGS. 6A and 6B. As illustrated in FIG. 6A, when the traveling state of the vehicle is the nearly straight traveling state and the wheel 10 is in the normal state, a vibration that is generated due to the change in the wheel speed of the wheel 10 is small. Thus, when the four wheels 10 are in the normal state, the standard deviation e, which is the variation value of the vehicle-body lateral acceleration Gy, is small as indicated by the arrow E in FIG. 6A.

When at least one of the four wheels 10 is in the loose state, on the other hand, the wheel speed greatly changes during one rotation of the wheel 10. Thus, a large vibration is applied to the vehicle body in the lateral direction due to the large change in the wheel speed, as illustrated in FIG. 6B. This causes a large change in the vehicle-body lateral acceleration Gy, so that the variations of the vehicle-body lateral acceleration Gy is large as indicated by the arrow F and the standard deviation e is accordingly large.

In the present embodiment, there is stored, in advance, a standard deviation ey0 of the vehicle-body lateral acceleration Gy when the four wheels 10 are in the normal state, and there is obtained a ratio α between a standard deviation ey* of actual vehicle-body lateral acceleration Gy and the standard deviation ey0 of the vehicle-body lateral acceleration Gy in the normal state. α=ey*/ey0

When the ratio α is greater than a fifth set ratio α5 that is greater than 1 (α>α5>1), it is determined that at least one of the front right and left wheels and the rear right and left wheels is in the loose state.

Further, notification may be made in mutually different ways for: a case in which at least one wheel 10 is determined to be in the loose state based on the ratio of the variation values of the wheel speed differences δ and at least one wheel 10 is determined to be in the loose state based on the variation value of the vehicle-body lateral acceleration Gy; and a case in which at least one wheel 10 is determined to be in the loose state based on the ratio of the variation values of the wheel speed differences δ and/or the variation value of the vehicle-body lateral acceleration Gy.

In the former case, information indicating that the wheel 10 is in the loose state with high probability is notified to both the vehicle occupant and the vehicle manager, the vehicle operation business operator, etc.

In the latter case, though there is a possibility that the wheel 10 is in the loose state, the possibility is low. In this instance, information to encourage checking of the fastened condition of the hub bolts, etc., may be notified to the vehicle manager and the vehicle operation business operator without being notified directly to the vehicle occupant.

Figure 7:
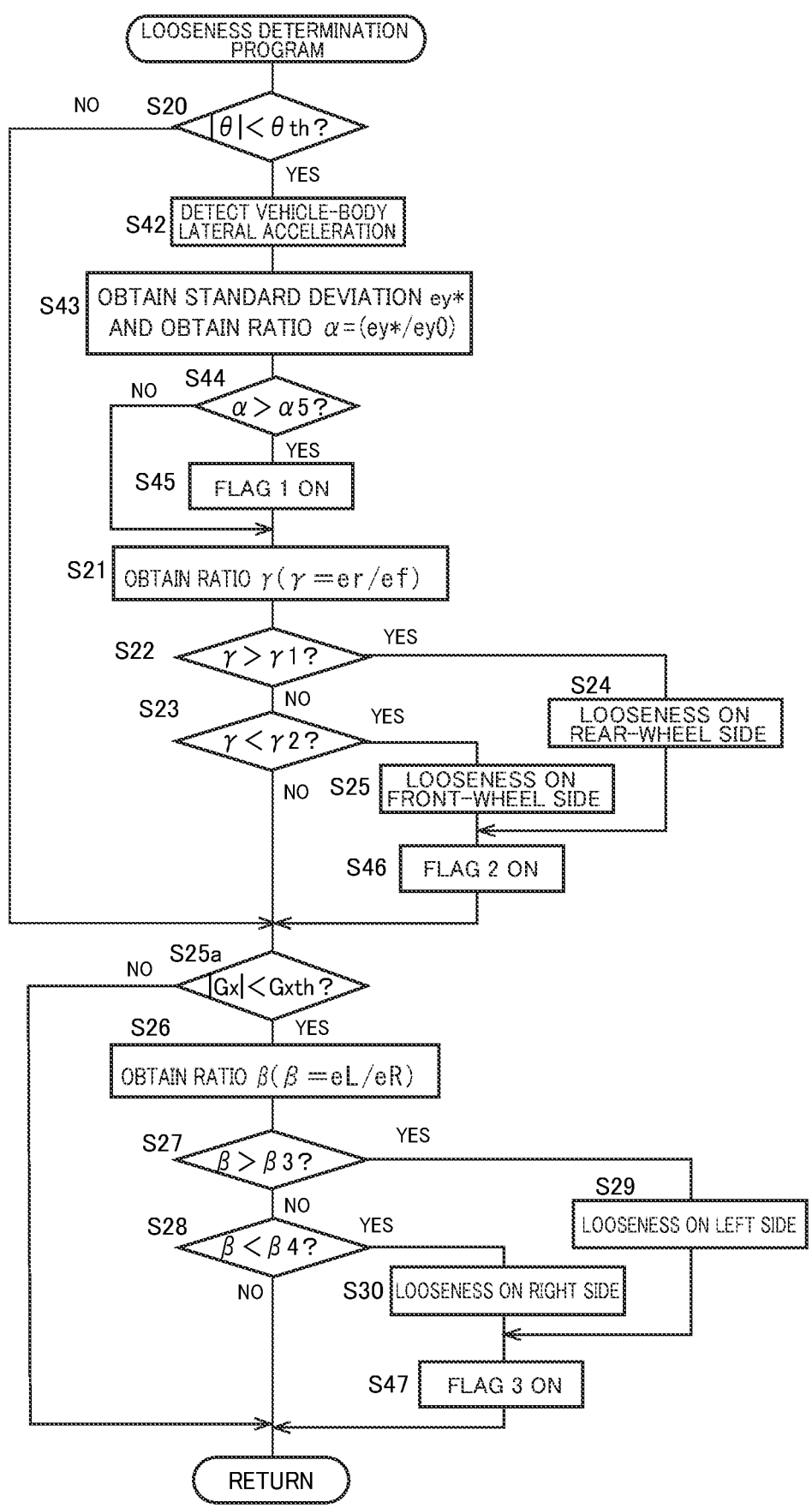
FIG. 7 is a flowchart representing a looseness determination program stored in the wheel state obtaining system.
Figure 8:
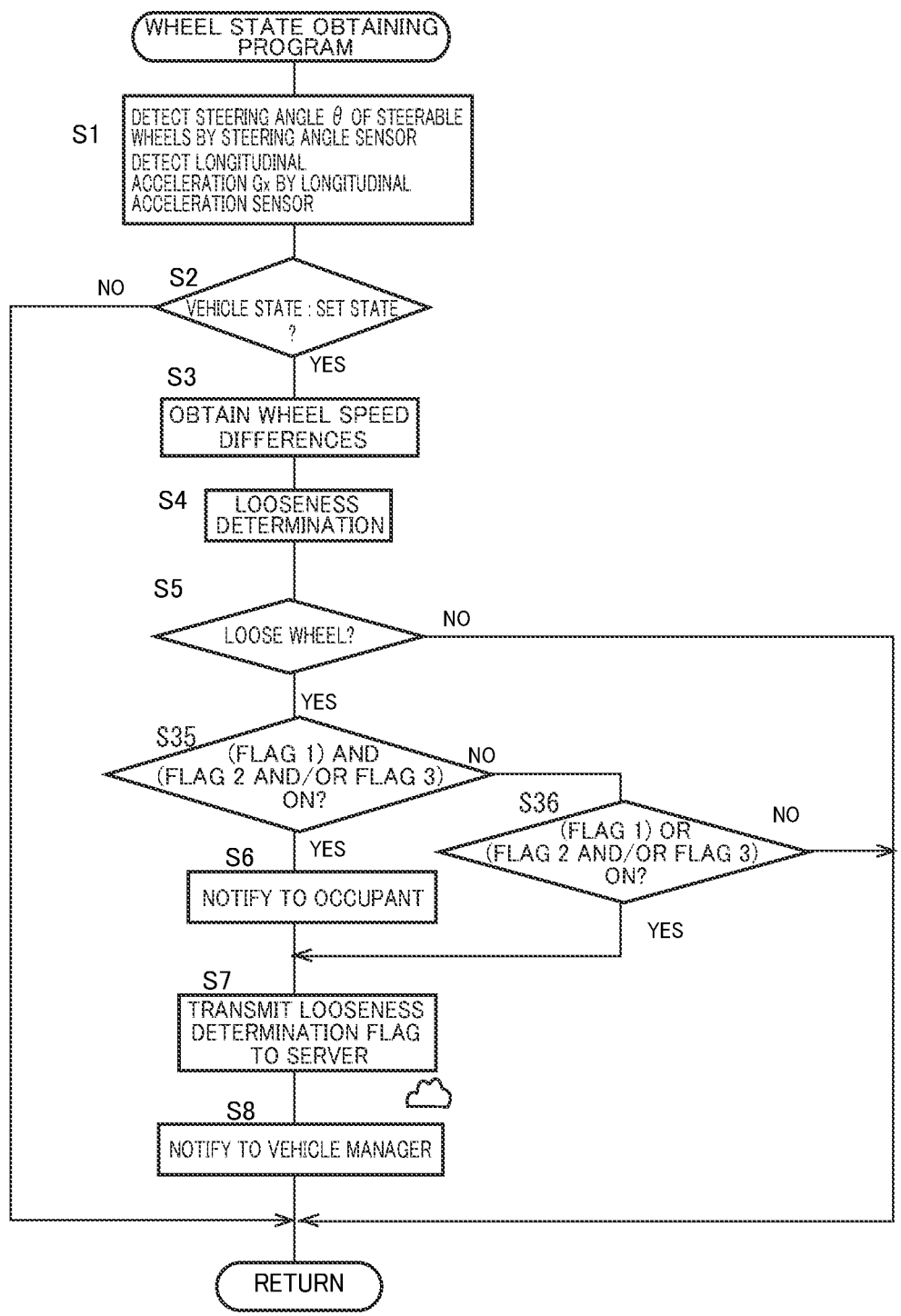
FIG. 8 is a flowchart conceptually illustrating obtainment of the wheel state executed by the wheel state obtaining system.

The looseness determination in the present embodiment is executed by execution of S4 and S5 in FIG. 8 (i.e., a looseness determination program represented by a flowchart of FIG. 7), and the notification of the information indicating the wheel state is executed by execution of S6-S8, S35, and S36 of a wheel state obtaining program represented by a flow chart of FIG. 8.

The same step numbers as used in the looseness determination program represented by the flowchart of FIG. 4 are used to designate the corresponding step numbers in the looseness determination program represented by the flowchart of FIG. 7, an explanation of which is dispensed with. The same step numbers as used in the wheel state obtaining program represented by the flowchart of FIG. 2 are used to designate the corresponding step numbers in the wheel state obtaining program represented by the flowchart of FIG. 8, an explanation of which is dispensed with.

At S20 of the looseness determination program represented by the flowchart of FIG. 7, it is determined whether the absolute value of the steering angle θ is less than the set steering angle. That is, it is determined whether the vehicle is in a state in which the lateral acceleration caused by turning of the vehicle is not being generated. When a negative determination NO is made, S42-S46 and S21-S25 are not executed.

When an affirmative determination YES is made at S20, the control flow proceeds to S42 at which a plurality of detection values of the vehicle-body lateral acceleration sensor 18 is obtained. At S43, the standard deviation ey* is obtained, and the ratio α (ey*/ey0) is obtained by dividing the obtained standard deviation ey* by the standard deviation ey0 of the vehicle-body lateral acceleration Gy when the four wheels 10 are in the normal state. At S44, it is determined whether the ratio α is greater than the fifth set ratio α5. When an affirmative determination YES is made, the control flow proceeds to S45 to set a flag 1 to ON. When a negative determination NO is made, S45 is not executed.

When it is determined at S21-S25 that at least one of the right and left wheels of the front-wheel side or the rear-wheel side is in the loose state, the control flow proceeds to S46 to set a flag 2 to ON.

When it is determined at S25a-S30 that at least one of the front and rear wheels of the left-wheel side or the right-wheel side is in the loose state, the control flow proceeds to S47 to set a flag 3 to ON.

When it is determined at S5 of the wheel state obtaining program represented by the flowchart of FIG. 8 that at least one wheel 10 is in the loose state, the state of each of the flags 1-3 is obtained at S35 and S36. At S35, it is determined whether both of: the flag 1; and at least one of the flag 2 and the flag 3 are ON (e.g., the flags 1, 2 are ON, the flags 1, 3 are ON, or the flags 1, 2, 3 are ON). At S36, it is determined whether one of: the flag 1; and at least one of the flag 2 and the flag 3 is ON (e.g., the flag 1 is ON and the flags 2, 3 are OFF or the flag 1 is OFF and at least one of the flag 2 and the flag 3 is ON). When an affirmative determination YES is made at S35, S6-S8 are executed. In the present embodiment, the information indicating that the wheel 10 is in the loose state with high probability is notified to the vehicle occupant, the vehicle manager, and the vehicle operation business operator.

When a negative determination NO is made at S35 and an affirmative determination YES is made at S36, S6 is skipped. The control flow then proceeds to S7 and S8 at which the information encouraging checking of the fastened state of the hub bolts, etc., is notified to the vehicle manager and the vehicle operation business operator without being notified to the vehicle occupant, because there is a possibility that the wheel 10 is in the loose state.

In the present embodiment, it is determined whether the wheel 10 is in the loose state based on both the ratio of the variation values of the wheel speed differences δ and the variation value of the vehicle-body lateral acceleration Gy. This configuration enables appropriate determination as to whether the wheel 10 is in the loose state.

The information whose contents are mutually different is notified in configurations mutually different between the case where it is determined that the wheel 10 is in the loose state with high probability and the case where it is determined that the wheel 10 is in the loose state with low probability. This enables appropriate notification of the information on the loose state of the wheel 10.

The wheel state can be obtained not based on the variations of the wheel speed difference but based on the variations of the vehicle-body lateral acceleration.

Third Embodiment

In the embodiments illustrated above, the obtainment of the set state at S2 of the flowchart of FIG. 2 and the looseness determination at S4 and S5 of the flowchart of FIG. 2 are executed by the ECU 20 of the vehicle, and the notification at S8 is executed by the cloud computer 26. In this third embodiment, the obtainment of the set state at S2, the looseness determination at S4 and S5, and the notification at S8 of the flowchart of FIG. 2 are executed by the cloud computer 26 (hereinafter referred to as "server 26" where appropriate). Thus, the ECU 20 of the vehicle may execute part of or the entirety of the wheel state obtaining program or the server 26 may execute part of or the entirety of the wheel state obtaining program.

Figure 9:
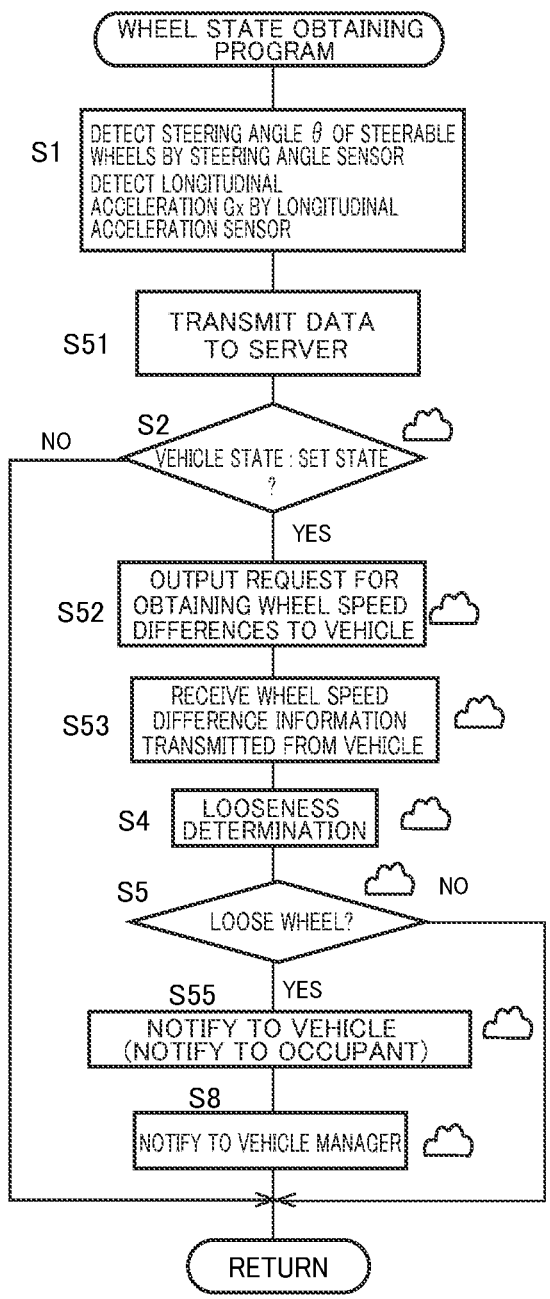
FIG. 9 is a flowchart conceptually illustrating obtainment of the wheel state executed by a wheel state obtaining system according to a third embodiment of the present disclosure.

One example of such a configuration is indicated by a flowchart of FIG. 9. The same step numbers as used in the flowchart of FIG. 2 are used to designate the same step numbers in the flowchart of FIG. 9, an explanation of which is dispensed with.

At S1, the longitudinal acceleration Gx, the steering angle θ, etc., are detected. At S51, information indicative of the longitudinal acceleration Gx, the steering angle θ, etc., are supplied to the server 26. The server 26 determines whether the vehicle state is the set state (S2). When an affirmative determination YES is made, the control flow proceeds to S52 at which the server 26 supplies an instruction to obtain the wheel speed differences to the ECU 20 of the vehicle. The ECU 20 executes the wheel-speed-difference obtaining program represented by the flowchart of FIG. 3 to obtain the wheel speed differences δf, δr, δL, a each in a plural number. At S53, the ECU 20 of the vehicle transmits, to the server 26, data of the wheel speed differences δf, δr, δL, a obtained each in a plural number. The server 26 receives the data of the wheel speed differences δf, δr, δL, a transmitted from the ECU 20 of the vehicle.

The server 26 obtains the standard deviations ef, er, eL, eR based on the wheel speed differences δf, δr, δL, δR each obtained in a plural number as described above, and the ratios γ, β are obtained. Based on the ratios γ, β, it is determined whether any of the wheels is in the loose state (S4, S5). When an affirmative determination YES is made, the presence of the wheel in the loose state and the information on the position of the wheel in the loose state are transmitted to the ECU 20 of the vehicle at S55 and are notified to the vehicle manager, the vehicle operation business operator, etc., via the input/output communication device 28 at S8. The information indicative of the position of the wheel in the loose state transmitted to the vehicle is notified to the vehicle occupant through indication on the display 22, for instance.

After the ECU 20 of the vehicle determines that the traveling state of the vehicle is the set state (S2) and obtains the wheel speed differences δf, δr, δL, δR each in a plural number, the information indicative of the wheel speed differences δ may be transmitted to the server 26. In this instance, the server 26 executes the looseness determination and the notification.

The information on the wheel in the loose state may be notified from the server 26 directly to the vehicle occupant.

Fourth Embodiment

Figure 10:
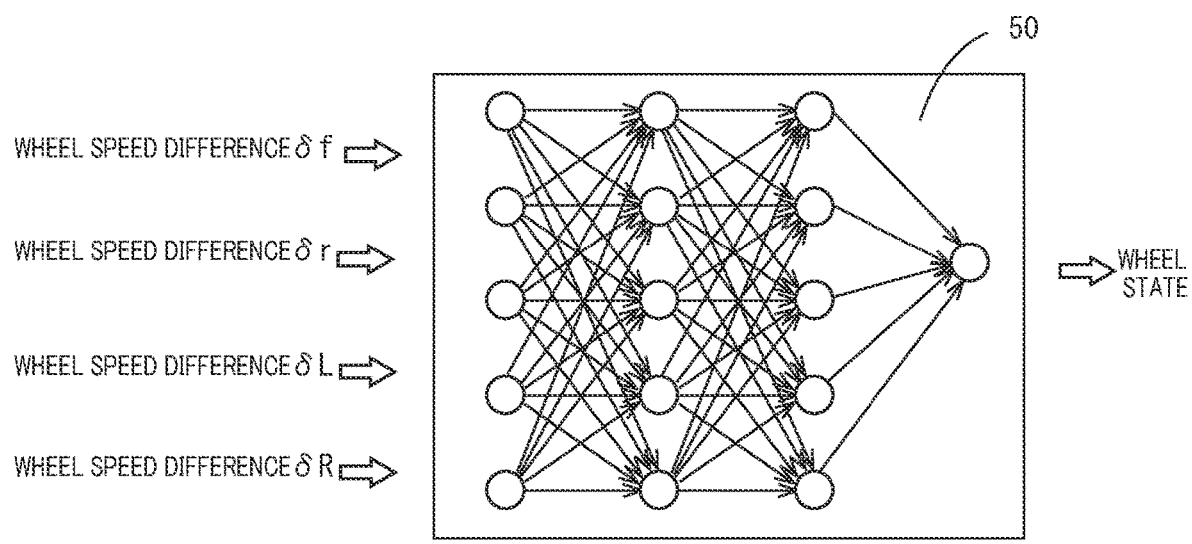
FIG. 10 is a conceptual view of a learned model included in a wheel state obtaining system according to a fourth embodiment of the present disclosure.

The wheel state may be obtained utilizing AI (artificial intelligence). As illustrated in FIG. 10, a computer performs machine learning in advance before shipment of the vehicle. (The computer may perform machine learning before a model is installed on the vehicle.) In the present embodiment, the computer performs machine learning using a known algorithm for machine learning such as neural networks by using multiple sets of data of the wheel speed differences δf, δr, δL, δR in a case where at least one of the four wheels 10 is in the loose state (corresponding to abnormal-state wheel speed difference data), multiple sets of data of the wheel speed differences δf, δr, δL, δR in a case where all the four wheels 10 are in the normal state (corresponding to normal-state wheel speed difference data), etc. In this way, a learned model 50, namely, a learned wheel state obtaining model 50, is created. The vehicle on which the learned wheel state obtaining model 50 is installed is shipped.

The wheel speed differences δf, δr, δL, δR actually obtained each in a plural number are input to the learned wheel state obtaining model 50 during traveling of the vehicle to thereby output whether at least one wheel 10 is in the loose state.

By inputting, to the computer, multiple sets of data of each wheel speed difference δf, δr, δL, δR in a case where all the four wheels 10 are in the normal state, the computer may perform leaning in advance to thereby create the learned model. In the vehicle on which the learned model is installed, the wheel speed differences δf, δr, δL, δR each in a plural number are input to the learned model to thereby output whether all the four wheels 10 are in the normal state.

It is to be understood that the present disclosure is not limited to the details of the illustrated embodiments but may be embodied with various changes and modifications, which may occur to those skilled in the art.

CLAIMABLE INVENTIONS (1) A wheel state obtaining system configured to obtain a wheel state that is a state of at least one of a plurality of wheels of a vehicle, including: a wheel speed detection device configured to detect a wheel speed of each of the plurality of wheels; a traveling state detection device configured to detect a traveling state of the vehicle; and a controller, wherein, when the traveling state of the vehicle detected by the traveling state detection device is a predetermined set state, the controller obtains a wheel speed difference of two of the plurality of wheels based on the wheel speeds of the plurality of wheels detected by the wheel speed detection device, and wherein the controller determines whether at least one of the two wheels is in an abnormal state based on the wheel speed difference.

It is determined that at least one of the two wheels is in the abnormal state when a maximum value of the absolute value of the wheel speed difference of the two wheels is greater than a threshold or when the variation value, which represents the variations of the wheel speed difference, is greater than a threshold.

The traveling state of the vehicle may or may not include the wheel speed.

The wheel speed may be the rotational speed of the wheel or may be the circumferential speed of the wheel.

(2) The wheel state obtaining system according to the form (1), wherein the controller determines whether the at least one of the two wheels is in the abnormal state based on a variation value indicative of variations of the wheel speed difference.

The variation value of the wheel speed difference may be a variance, a standard deviation, a difference between a maximum value and a minimum value, an interquartile range, or the like.

(3) A wheel state obtaining system configured to obtain a wheel state that is a state of at least one of a plurality of wheels of a vehicle, including: a wheel speed detection device configured to detect a wheel speed of each of the plurality of wheels; a traveling state detection device configured to detect a traveling state of the vehicle; and a controller, wherein the vehicle includes two wheel pairs each of which is constituted by two of four or more wheels that are the plurality of wheels, wherein, when the traveling state of the vehicle detected by the traveling state detection device is a predetermined set state, the controller obtains the wheel speed difference of the two wheels of one of the two wheel pairs and the wheel speed difference of the two wheels of the other of the two wheel pairs based on the wheel speeds of the plurality of wheels detected by the wheel speed detection device, and wherein the controller determines whether at least one of the four or more wheels is in the abnormal state based on a ratio between the wheel speed difference of the one of the two wheel pairs and the wheel speed difference of the other of the two wheel pairs.

(4) The wheel state obtaining system according to the form (3), wherein a value indicative of variations of the wheel speed difference of the two wheels of each of the two wheel pairs is defined as a variation value, and wherein, when a ratio between the variation value of one of the two wheel pairs and the variation value of the other of the two wheel pairs falls outside a predetermined set range, the controller determines that at least one of the two wheels of any one of the two wheel pairs, in which the variation value is greater than that in the other of the two wheel pairs, is in the abnormal state.

The set range may be a range between the first set ratio and the second set ratio or a range between the third set ratio and the fourth set ratio.

(5) The wheel state obtaining system according to the form (4), wherein one of the two wheel pairs includes front-side right and left wheels of the vehicle, wherein the other of the two wheel pairs includes rear-side right and left wheels of the vehicle, wherein the controller obtains the wheel speed difference of the front-side right and left wheels and the wheel speed difference of the rear-side right and left wheels based on the wheel speeds of the four or more wheels detected by the wheel speed detection device when the traveling state of the vehicle detected by the traveling state detection device is a state, as the set state, in which an absolute value of a steering angle of a steerable wheel of the vehicle is less than a set steering angle, wherein the controller obtains a ratio of the variation value of the wheel speed difference of the rear-side right and left wheels with respect to the variation value of the wheel speed difference of the front-side right and left wheels based on the wheel speed difference of the front-side right and left wheels and the wheel speed difference of the rear-side right and left wheels, wherein, when the ratio is greater than a first set ratio that is greater than 1, the controller determines that at least one of the rear-side right and left wheels is in the abnormal state, and wherein, when the ratio is less than a second set ratio that is less than 1, the controller determines that at least one of the front-side right and left wheels is in the abnormal state.

In the state in which the absolute value of the steering angle of the steerable wheel is less than the set steering angle, it is estimated that the vehicle is in the nearly straight traveling state. The state in which the steering angle of the steerable wheel falls within the set range that is determined by the steering angle in straight traveling of the vehicle is considered as a state in which the operation amount of the steering operation member from the neutral position falls within the set range.

The ratio between the variation value ef of the wheel speed difference of the front-side right and left wheels and the variation value er of the wheel speed difference of the rear-side right and left wheels is a value (er/ef) obtained by dividing the variation value er of the wheel speed difference of the rear-side right and left wheels by the variation value ef of the wheel speed difference of the front-side right and left wheels.

(6) The wheel state obtaining system according to the form (4) or (5), wherein one of the two wheel pairs includes left-side front and rear wheels of the vehicle, wherein the other of the two wheel pairs includes right-side front and rear wheels of the vehicle, wherein the controller obtains the wheel speed difference of the left-side front and rear wheels and the wheel speed difference of the right-side front and rear wheels based on the wheel speeds of the four or more wheels detected by the wheel speed detection device when the traveling state of the vehicle detected by the traveling state detection device is a state, as the set state, in which an absolute value of longitudinal acceleration of the vehicle is less than set acceleration, wherein the controller obtains a ratio of the variation value of the wheel speed difference of the left-side front and rear wheels with respect to the variation value of the wheel speed difference of the right-side front and rear wheels based on the wheel speed difference of the left-side front and rear wheels and the wheel speed difference of the right-side front and rear wheels, wherein, when the ratio is greater than a third set ratio that is greater than 1, the controller determines that at least one of the left-side front and rear wheels is in the abnormal state, and wherein, when the ratio is less than a fourth set ratio that is less than 1, the controller determines that at least one of the right-side front and rear wheels is in the abnormal state.

The state in which the absolute value of the longitudinal acceleration is less than the set acceleration is considered as a state in which the vehicle is in the nearly constant-speed traveling state.

The ratio of the variation value eL of the wheel speed difference of the left-side front and rear wheels with respect to the variation value eR of the wheel speed difference of the right-side front and rear wheels is a value (eL/eR) obtained by dividing the variation value eL of the wheel speed difference of the left-side front and rear wheels by the variation value eR of the wheel speed difference of the right-side front and rear wheels.

(7) The wheel state obtaining system according to any one of the forms (1) through (6), further including a vehicle-body lateral acceleration detection device configured to detect vehicle-body lateral acceleration that is lateral acceleration that acts on a body of the vehicle, wherein, when the traveling state of the vehicle detected by the traveling state detection device is the set state, the controller obtains a variation value indicative of variations of the vehicle-body lateral acceleration based on the vehicle-body lateral acceleration detected by the vehicle-body lateral acceleration detection device, and wherein the controller determines whether at least one of the plurality of wheels is in the abnormal state based on the variation value.

In a case where one of the four wheels is in the abnormal state, the vibration of the vehicle body in the lateral direction is large due to a change in the wheel speed of the one wheel in the abnormal state. This causes a large change in the vehicle-body lateral acceleration, resulting in an increase in the variation value of the vehicle-body lateral acceleration.

(8) The wheel state obtaining system according to the form (7), wherein, when a standard deviation, which is the variation value of the vehicle-body lateral acceleration, is greater than a set value, the controller determines that at least one of the plurality of wheels is in the abnormal state.

For instance, it can be determined that at least one of the plurality of wheels is in the abnormal state when a value (a) obtained by dividing the variation value of the actual vehicle-body lateral acceleration by the variation value of the vehicle-body lateral acceleration when the plurality of wheels is all in the normal state is greater than the set value ($\alpha$5).

Further, it can be determined that at least one of the plurality of wheels is in the abnormal state when the variation value of the actual vehicle-body lateral acceleration is greater than a set variation value.

(9) The wheel state obtaining system according to any one of the forms (1) through (8), wherein the controller sets, to the set state, at least one of: a state in which an absolute value of a steering angle of a steerable wheel of the vehicle is less than a set steering angle; and a state in which an absolute value of longitudinal acceleration that acts on the vehicle is less than set acceleration, and wherein the controller determines whether the traveling state of the vehicle is the set state.

The set state is a state in which the force applied to the plurality of wheels is small. It is possible to accurately determine whether the wheel state is the abnormal state based on the wheel speed difference of the two wheels when the traveling state of the vehicle is the set state.

(10) The wheel state obtaining system according to any one of the forms (1) through (8), wherein the controller sets, to the set state, at least one of: a state in which an absolute value of longitudinal acceleration of the vehicle changes between (a) a state in which the absolute value of the longitudinal acceleration is less than set acceleration and (b) a state in which the absolute value of the longitudinal acceleration is not less than the set acceleration; and a state in which an absolute value of a steering angle of a steerable wheel of the vehicle changes between (c) a state in which the absolute value of the steering angle is less than a set steering angle and (d) a state in which the absolute value of the steering angle is not less than the set steering angle, and wherein the controller determines whether the traveling state of the vehicle is the set state.

(11) A wheel state obtaining system configured to obtain a wheel state that is a state of at least one of four or more wheels of a vehicle, including: a wheel speed detection device configured to detect a wheel speed of each of the four or more wheels; and a controller, wherein the vehicle includes two wheel pairs each of which is constituted by two of the four or more wheels, wherein the controller obtains the wheel speed difference of the two wheels of each of the two wheel pairs based on the wheel speeds of the four or more wheels detected by the wheel speed detection device, wherein the controller obtains a ratio between the wheel speed difference of one of the two wheel pairs and the wheel speed difference of the other of the two wheel pairs based on the wheel speed differences of the two wheel pairs, and wherein the controller determines, based on the ratio, whether the at least one of the four or more wheels is in the abnormal state.

It is not essential to determine the abnormal state based on the wheel speeds detected when the traveling state of the vehicle is the set state.

The wheel state obtaining system according to this form may employ the technical features described in any one of the forms (1)-(10).

(12) The wheel state obtaining system according to any one of the forms (1) through (11), wherein the controller includes a learned model obtained by performing machine learning in advance utilizing, as learning data, (i) a plural sets of normal-state wheel speed difference data indicative of the wheel speed differences of the two wheels when the traveling state of the vehicle is the set state in a case where the plurality of wheels is all normal and (ii) a plural sets of abnormal-state wheel speed difference data indicative of the wheel speed differences of the two wheels when the traveling state of the vehicle is the set state in a case where at least one of the plurality of wheels is in the abnormal state, and wherein it is determined whether the at least one of the plurality of wheels is in the abnormal state by inputting the wheel speed difference to the learned model.

(13) The wheel state obtaining system according to any one of the forms (1) through (12), wherein the controller includes a learned model obtained by performing machine learning in advance utilizing, as learning data, a plural sets of wheel speed difference data indicative of the wheel speed differences of at least two of the plurality of wheels when the traveling state of the vehicle is the set state in a case where the plurality of wheels is all normal, and wherein it is determined whether at least one of the plurality of wheels is in the abnormal state by inputting the wheel speed difference to the learned model.

(14) The wheel state obtaining system according to any one of the forms (1) through (13), wherein the controller determines whether the at least one of the plurality of wheels is in the abnormal state based on a variation value indicative of variations of the wheel speed difference of the two wheels and a variation value indicative of variations of vehicle-body lateral acceleration that is lateral acceleration that acts on a body of the vehicle, and wherein the wheel state obtaining system includes a notification device configured to notify that the at least one of the plurality of wheels is in the abnormal when the controller determines that the at least one of the plurality of wheels is in the abnormal state.

The notification device may be configured to notify in configurations mutually different for the case where the variation value of the wheel speed difference of the two wheels is large and the variation value of the vehicle-body lateral acceleration is large and the case where the variation value of the wheel speed difference of the two wheels and/or the variation value of the vehicle-body lateral acceleration is large.

In the embodiment illustrated above, the notification device is constituted by the display 22 and the input/output communication device 28, for instance.

(15) A wheel state obtaining system configured to obtain a wheel state that is a state of at least one of a plurality of wheels of a vehicle, including: a vehicle-body lateral acceleration detection device configured to detect vehicle-body lateral acceleration that is lateral acceleration that acts on a body of the vehicle; a traveling state detection device configured to detect a traveling state of the vehicle; and a controller, wherein, when the traveling state detection device determines that the traveling state of the vehicle is a straight traveling state, the controller determines whether the at least one of the plurality of wheels is in the abnormal state based on variations of the vehicle-body lateral acceleration detected by the vehicle-body lateral acceleration detection device.

The wheel state obtaining system according to this form may employ the technical features described in any one of the forms (1)-(14).

For instance, it is determined whether at least one wheel is in the abnormal state based on the variation value indicative of the variations of the vehicle-body lateral acceleration.

(16) A method of obtaining a wheel state that is a state of at least one of a plurality of wheels of the vehicle, including: (a) determining whether a traveling state of the vehicle is a predetermined set state; (b) obtaining a wheel-speed-difference of two wheels of one of two wheel pairs and a wheel speed difference of two wheels of the other of the two wheel pairs based on wheel speeds of the plurality of wheels when it is determined in step (a) that the traveling state of the vehicle is the set state, the two wheels of each of the two wheel pairs being included in four or more wheels that are the plurality of wheels; and (c) determining whether at least one of the plurality of wheels is in an abnormal state based on a ratio between a variation value indicative of variations of the wheel speed difference of the one of the two wheel pairs and a variation value indicative of variations of the wheel speed difference of the other of the two wheel pairs, each of the variation values being obtained in step (b).

The method according to this form may employ the technical features described in any one of the forms (1)-(15).

What is claims is:

1. A wheel state obtaining system configured to obtain a fastened condition of at least one of a plurality of wheels of a vehicle, comprising:
    a wheel speed detection device configured to detect a wheel speed of each of the plurality of wheels;
    a traveling state detection device configured to detect a traveling state of the vehicle; and
    a controller,
    wherein the vehicle includes two wheel pairs each of which is constituted by two of four or more wheels that are the plurality of wheels,
    wherein, when the traveling state of the vehicle detected by the traveling state detection device is a predetermined set state, the controller obtains the wheel speed difference of the two wheels of one of the two wheel pairs and the wheel speed difference of the two wheels of the other of the two wheel pairs based on the wheel speeds of the plurality of wheels detected by the wheel speed detection device,
    wherein the controller obtains a ratio between the wheel speed differences for the two wheel pairs and determines, based on the obtained ratio, the presence or absence of looseness of the fastened condition of at least one of the four or more wheels, and
    wherein, when the presence of looseness of the fastened condition of at least one of the four or more wheels is determined, the controller notifies the presence of looseness of the fastened condition to an occupant of the vehicle via a display of the vehicle.

2. The wheel state obtaining system according to claim 1,
wherein the controller obtains a variation value, which is a value indicative of variations of the wheel speed difference of the two wheels of each of the two wheel pairs,
wherein the controller obtains a ratio between the variation value of one of the two wheel pairs and the variation value of the other of the two wheel pairs,
wherein the controller determines whether the ratio falls within a predetermined set range,
wherein, when the ratio falls outside the predetermined set range, the controller determines the presence of looseness of the fastened condition of at least one of the two wheels of any one of the two wheel pairs, in which the variation value is greater than that in the other of the two wheel pairs.

3. The wheel state obtaining system according to claim 2,
wherein one of the two wheel pairs includes front-side right and left wheels of the vehicle,
wherein the other of the two wheel pairs includes rear-side right and left wheels of the vehicle,
wherein the controller obtains the wheel speed difference of the front-side right and left wheels and the wheel speed difference of the rear-side right and left wheels based on the wheel speeds of the four or more wheels detected by the wheel speed detection device when the traveling state of the vehicle detected by the traveling state detection device is a state, as the set state, in which an absolute value of a steering angle of a steerable wheel of the vehicle is less than a set steering angle,
wherein the controller obtains a ratio of the variation value of the wheel speed difference of the rear-side right and left wheels with respect to the variation value of the wheel speed difference of the front-side right and left wheels based on the wheel speed difference of the front-side right and left wheels and the wheel speed difference of the rear-side right and left wheels,
wherein, when the ratio is greater than a first set ratio that is greater than 1, the controller determines that at least one of the rear-side right and left wheels is in the abnormal state, and
wherein, when the ratio is less than a second set ratio that is less than 1, the controller determines that at least one of the front-side right and left wheels is in the abnormal state.

4. The wheel state obtaining system according to claim 2,
wherein one of the two wheel pairs includes left-side front and rear wheels of the vehicle,
wherein the other of the two wheel pairs includes right-side front and rear wheels of the vehicle,
wherein the controller obtains the wheel speed difference of the left-side front and rear wheels and the wheel speed difference of the right-side front and rear wheels based on the wheel speeds of the four or more wheels detected by the wheel speed detection device when the traveling state of the vehicle detected by the traveling state detection device is a state, as the set state, in which an absolute value of longitudinal acceleration of the vehicle is less than set acceleration, and
wherein the controller obtains a ratio of the variation value of the wheel speed difference of the left-side front and rear wheels with respect to the variation value of the wheel speed difference of the right-side front and rear wheels based on the wheel speed difference of the left-side front and rear wheels and the wheel speed difference of the right-side front and rear wheels, and
wherein, when the ratio is greater than a third set ratio that is greater than 1, the controller determines that at least one of the left-side front and rear wheels is in the abnormal state, and
wherein, when the ratio is less than a fourth set ratio that is less than 1, the controller determines that at least one of the right-side front and rear wheels is in the abnormal state.

5. The wheel state obtaining system according to claim 1,
wherein the controller sets, to the set state, at least one of:
a state in which an absolute value of a steering angle of a steerable wheel of the vehicle is less than a set steering angle; and a state in which an absolute value of longitudinal acceleration that acts on the vehicle is less than a set acceleration, and
wherein the controller determines whether the traveling state of the vehicle is the set state.

6. The wheel state obtaining system according to claim 1,
wherein the controller includes a learned model obtained by performing machine learning in advance utilizing, as learning data, (i) a plural sets of normal-state wheel speed difference data indicative of the wheel speed differences of the two wheels when the traveling state of the vehicle is the set state in a case where the plurality of wheels is all normal and (ii) a plural sets of abnormal-state wheel speed difference data indicative of the wheel speed differences of the two wheels when the traveling state of the vehicle is the set state in a case where at least one of the plurality of wheels is in the abnormal state, and
wherein it is determined whether the at least one of the plurality of wheels is in the abnormal state by inputting the wheel speed difference to the learned model.

7. The wheel state obtaining system according to claim 1, further comprising:
a vehicle-body lateral acceleration detection device configured to detect vehicle-body lateral acceleration that is lateral acceleration that acts on a body of the vehicle;
wherein, when the traveling state detection device determines that the traveling state of the vehicle is a straight traveling state, the controller determines the presence or absence of looseness of the fastened condition of the at least one of the plurality of wheels based on variations of the vehicle-body lateral acceleration detected by the vehicle-body lateral acceleration detection device.

8. A method of obtaining a wheel state that is a state of at least one of a plurality of wheels of the vehicle, comprising:
(a) determining whether a traveling state of the vehicle is a predetermined set state;
(b) obtaining a wheel-speed-difference of two wheels of one of two wheel pairs and a wheel speed difference of two wheels of the other of the two wheel pairs based on wheel speeds of the plurality of wheels when it is determined in step (a) that the traveling state of the vehicle is the set state, the two wheels of each of the two wheel pairs being included in four or more wheels that are the plurality of wheels;
(c) obtaining a variation value, which is a value indicative of variations of the wheel speed difference of the two wheels of each of the two wheel pairs obtained in step (b);
(d) obtaining a ratio between the variation value of one of the two wheel pairs and the variation value of the other of the two wheel pairs obtained in step (c);

(e) determining whether the ratio obtained in step (d) falls within a predetermined set range;

(f) determining the presence of looseness of the fastened condition of at least one of the two wheels of any one of the two wheel pairs, in which the variation value is greater than that in the other of the two wheel pairs, when it is determined in step (e) that the ratio falls outside the predetermined set range; and (g) notifying, to an occupant of the vehicle via a display of the vehicle, the presence of looseness of the fastened condition when the presence of looseness of the fastened condition of at least one of the two wheels of any one of the two wheel pairs, in which the variation value is greater than that in the other of the two wheel pairs, is determined in step (f).

9. A wheel state obtaining system configured to obtain a fastened condition of at least one of four or more wheels of a vehicle including front-side right and left wheels and rear-side right and left wheels, comprising:

a vehicle-body lateral acceleration detection device configured to detect vehicle-body lateral acceleration that is lateral acceleration that acts on a body of the vehicle;

a wheel speed detection device configured to detect a wheel speed of each of the four or more wheels;

a traveling state detection device configured to detect a traveling state of the vehicle;

a first controller configured such that, when the traveling state detected by the traveling state detection device is a state in which an absolute value of a steering angle of a steerable wheel of the vehicle is less than a set steering angle, the first controller obtains a ratio of a variation value of a wheel speed difference of the rear-side right and left wheels with respect to a variation value of a wheel speed difference of the front-side right and left wheels based on the wheel speed difference of the front-side right and left wheels and the wheel speed difference of the rear-side right and left wheels, configured such that, when the ratio is greater than a first set ratio that is greater than 1, the first controller determines looseness of a fastened condition of at least one of the rear-side right and left wheels, and configured such that, when the ratio is less than a second set ratio that is less than 1, the first controller determines looseness of a fastened condition of at least one of the front-side right and left wheels;

a second controller configured such that, when the traveling state of the vehicle detected by the traveling state detection device is a straight traveling state, the second controller determines looseness of the fastened condition of the at least one wheel based on variations of the vehicle-body lateral acceleration detected by the vehicle-body lateral acceleration detection device; and a notification device configured such that, when both the first controller and the second controller determine looseness of the fastened condition of the at least one wheel, the notification device notifies to an occupant of the vehicle and a manager of the vehicle and configured such that, when one of the first controller and the second controller determines the looseness of the fastened condition of the at least one wheel and the other of the first controller and the second controller does not determine the looseness of the fastened condition of the at least one wheel, the notification device notifies to the manager and does not notify to the occupant via a display of the vehicle.

* * * * *